US006935450B1

(12) United States Patent
Tsuzuki et al.

(10) Patent No.: US 6,935,450 B1
(45) Date of Patent: Aug. 30, 2005

(54) HYBRID VEHICLE DRIVING DEVICE (75) Inventors: Shigeo Tsuzuki, Anjo (JP); Takeshi Inuzuka, Anjo (JP); Satoru Wakuta, Anjo (JP); Takahiro Kido, Anjo (JP); Takao Taniguchi, Anjo (JP); Kazumasa Tsukamoto, Anjo (JP); Kenji Omote, Anjo (JP)

(73) Assignee: Aisin Aw Co., Ltd. (JP)

( * ) Notice: Subject to any disclaimer, the term of this patent is extended or adjusted under 35 U.S.C. 154(b) by 10 days.

(21) Appl. No.: 09/857,125

(22) PCT Filed: Oct. 2, 2000

(86) PCT No.: PCT/JP00/06766

§ 371 (c)(1),
(2), (4) Date: Aug. 28, 2001

(87) PCT Pub. No.: WO01/25043

PCT Pub. Date: Apr. 12, 2001

(30) Foreign Application Priority Data

| Oct. 1, 1999 | (JP) | ............................................ 11-282177 |
| Jun. 15, 2000 | (JP) | ..................................... 2000-179885 |
| Sep. 26, 2000 | (JP) | ..................................... 2000-292978 |

(51) Int. Cl.$^7$ ............................................................. B60K 1/00
(52) U.S. Cl. ..................................... 180/65.2; 180/65.3
(58) Field of Search .............................. 180/65.1, 65.2, 180/65.3, 65.4, 291

(56) References Cited

U.S. PATENT DOCUMENTS

| 3,581,851 | A | * | 6/1971 | Hall, II | ..................... 192/3.31 |
| 4,743,776 | A | * | 5/1988 | Baehler et al. | ................ 290/31 |
| 5,103,127 | A | * | 4/1992 | Peter | ........................... 310/113 |
| 5,513,719 | A | * | 5/1996 | Moroto et al. | ............. 180/65.4 |
| 5,796,195 | A | * | 8/1998 | Miyakawa | ................ 310/68 B |
| 6,041,901 | A | | 3/2000 | Werner et al. | ............. 192/3.28 |
| 6,092,985 | A | | 7/2000 | Winkam | ................... 415/124.1 |
| 6,208,036 | B1 | * | 3/2001 | Evans et al. | ................... 290/46 |
| 6,258,001 | B1 | * | 7/2001 | Wakuta et al. | .................. 475/5 |
| 6,307,277 | B1 | * | 10/2001 | Tamai et al. | .............. 290/40 C |
| 6,340,339 | B1 | * | 1/2002 | Tabata et al. | ................... 475/5 |
| 6,478,101 | B1 | * | 11/2002 | Taniguchi et al. | ......... 180/65.2 |

FOREIGN PATENT DOCUMENTS

| DE | 4007424 A1 | 10/1990 | |
| JP | 05-030605 | 2/1993 | ............. B60L/7/00 |
| JP | 09-215270 | 8/1997 | ............. H02K/9/02 |

* cited by examiner

Primary Examiner—Christopher P. Ellis
Assistant Examiner—Bridget Avery
(74) Attorney, Agent, or Firm—Lorusso & Loud (57) ABSTRACT A motor/generator is arranged radially outward of a middle portion of a front cover of a torque converter so that at least a part of the motor/generator axially overlaps the torque converter, with a predetermined gap (C) between the front cover and the rotor of the motor/generator. The rotor of the motor/generator is supported by either the torque converter or an engine crankshaft or by any two of the torque converter, a motor housing and the crankshaft. The rotor is not affected by the torque converter and the efficiency of the motor is not reduced.

24 Claims, 9 Drawing Sheets

HYBRID VEHICLE DRIVING DEVICE

CROSS-REFERENCE TO RELATED APPLICATIONS

This application is a National Phase Application (35 USC 371) of PCT/JP00/06766 and claims priority of Japanese Application No. 11-282177 filed Oct. 1, 1999, Japanese Application No. 2000-17885 filed Jun. 15, 2000 and Japanese Application No. 2000-292978 filed Sep. 26, 2000. This application is also related to U.S. Pat. No. 6,478,101 which also claims priority of Japanese Application 11-282177 filed Oct. 1, 1999 and Japanese Application No. 2000-179885 filed Jun. 15, 2000.

TECHNICAL FIELD

The present invention relates to a drive apparatus in a hybrid vehicle of a parallel type in which an engine and a motor are connected for use as power sources, and more particularly to a drive apparatus for a hybrid vehicle in which a motor is additionally provided in a casing housing a transmission mechanism.

BACKGROUND ART

Conventionally, a parallel type hybrid vehicle has both an engine and a motor/generator transmit driving forces to the automatic transmission at the time of starting, accelerating or the like. In such conventional hybrid vehicles the motor/generator functions as a generator in traveling downhill or braking, thereby supplementing the engine brake effect, and regenerating braking energy thereby improving fuel economy and reducing the amount of discharge of exhaust gas.

For example, as disclosed in U.S. Pat. No. 5,789,823, a motor/generator is arranged radially outward of a torque converter and the rotor of the motor/generator is integrally fixed to a small diameter portion of the torque converter.

However, in the above-described conventional structure, since the rotor is arranged radially outward of the torque converter, the position of the rotor changes as the torque converter is deformed by a centrifugal hydraulic pressure, a charge or the like, so that there is the risk that the rotor will interfere with the stator due to radial displacement of the rotor. Accordingly, in order to prevent interference between the stator and the rotor, it is necessary to determine the gap between the rotor and the stator in expectation of deformation of the torque converter. However, as the gap between the stator and the rotor is increased, efficiency of the motor is reduced. Further, axial positions of the stator and the rotor shift, whereby efficiency of the motor is reduced. Further, since the torque converter generates a lot of heat, when the torque converter and the rotor are integrally formed, heat is transmitted from the torque converter resulting in demagnetizing of the rotor. Further, if a lockup clutch and the rotor are arranged close to each other, dust such as iron powder or the like enter the lockup clutch from the rotor magnets, thereby preventing the lockup clutch from operating.

Accordingly, an object of the present invention is to provide a drive apparatus for a hybrid vehicle which does not reduce efficiency of the motor while reducing the overall axial dimension of the drive apparatus.

DISCLOSURE OF THE INVENTION

According to the present invention, as shown in FIGS. 4 to 8, there is provided a drive apparatus for a hybrid vehicle comprising: an engine; a motor including a stator and a rotor; an automatic transmission having a fluid transmitting device; a case for receiving the motor; wherein driving force output from the engine and the motor is transmitted to an input member of the fluid transmitting device, and the motor is arranged at a position in which at least a part of the motor axially overlaps the fluid transmitting device, with a predetermined gap between the rotor and the fluid transmitting device, and wherein the rotor is supported by one of the fluid transmitting device and an output shaft of the engine or by a combination of any two of the fluid transmitting device, the case and the output shaft of the engine.

Accordingly, since the motor is arranged with at least a part thereof axially overlapping the fluid transmitting apparatus, the axial dimension of the drive apparatus is reduced. Further, since the motor is arranged around an outer circumference of the fluid transmitting device, with the predetermined gap between the rotor and the fluid transmitting device, the position of the rotor does not move even when the fluid transmitting device is deformed by the centrifugal hydraulic pressure, the charge or the like. Accordingly, there is no radial displacement of the rotor which would interfere with the stator. Further, since there is no possibility of interference between the rotor and the stator, it is not necessary to enlarge the gap to allow for such displacement, so that efficiency of the motor is not reduced. Further, the heat output from the fluid transmitting device is not easily transmitted and the magnet of the rotor is not degaussed.

Figure 4:
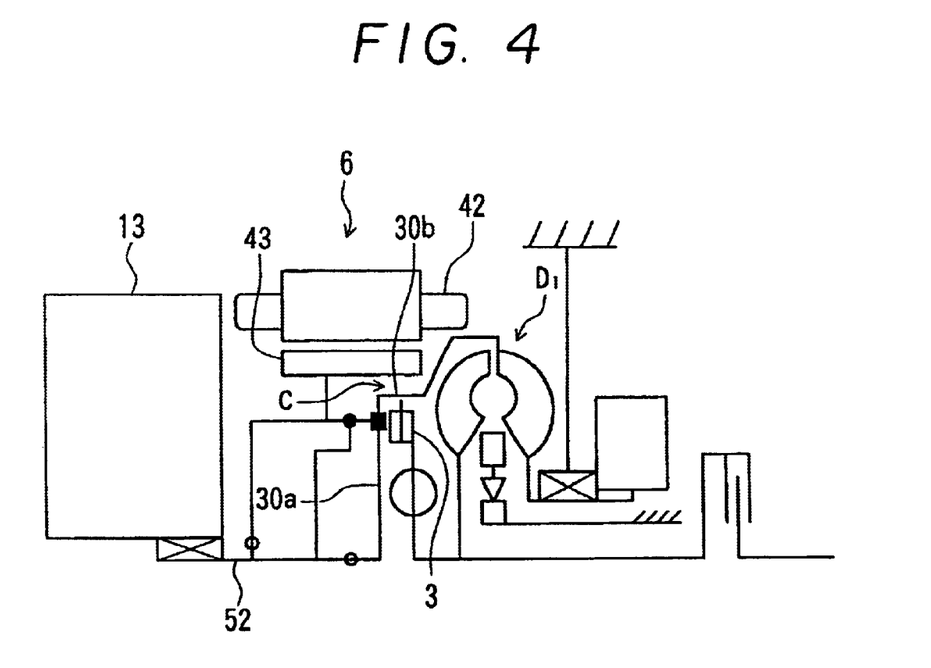
FIG. 4 is a skeletal view showing a variation of support for the rotor.

According to the embodiment of the present invention as shown in FIG. 4, the drive apparatus has the rotor supported by the output shaft of the engine and an input member of the fluid transmitting device. Accordingly, since the rotor is supported by the output shaft of the engine and the input member of the fluid transmitting device, the position of the rotor is not easily shifted, and it is easy to accurately set the gap between the rotor and the fluid transmitting device.

Figure 5:
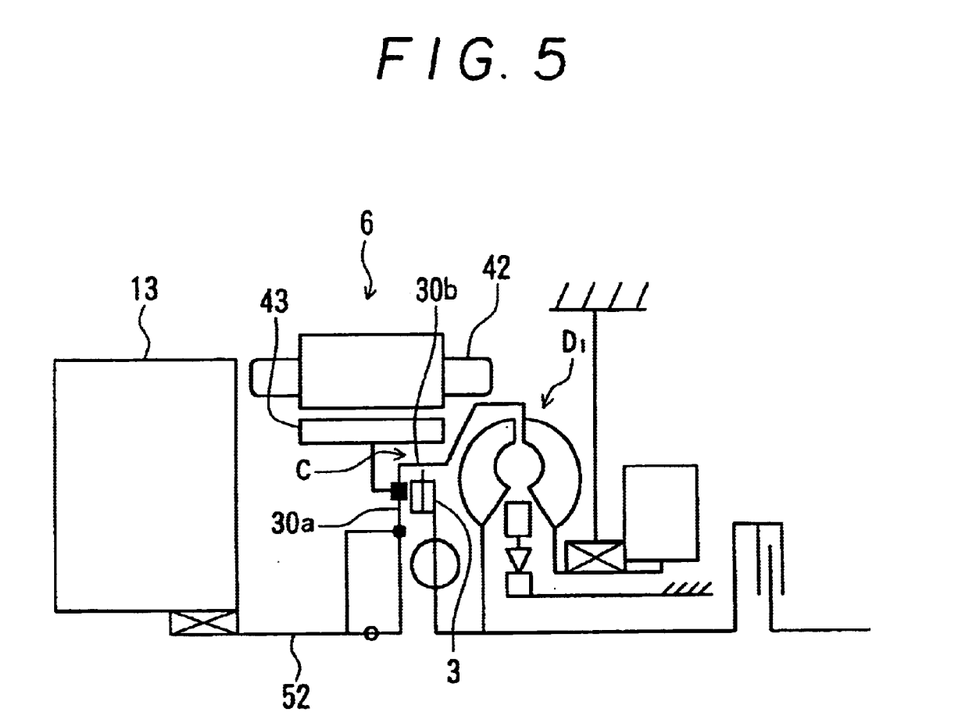
FIG. 5 is a skeletal view showing a variation of support for the rotor.

According to the embodiment as shown in FIG. 5, the drive apparatus has the rotor fixed to and supported by the input member of the fluid transmitting apparatus. Accordingly, since the rotor is fixed to and supported by the input member of the fluid transmitting device, it is easy to accurately set the gap between the rotor and the fluid transmitting apparatus.

Figure 6:
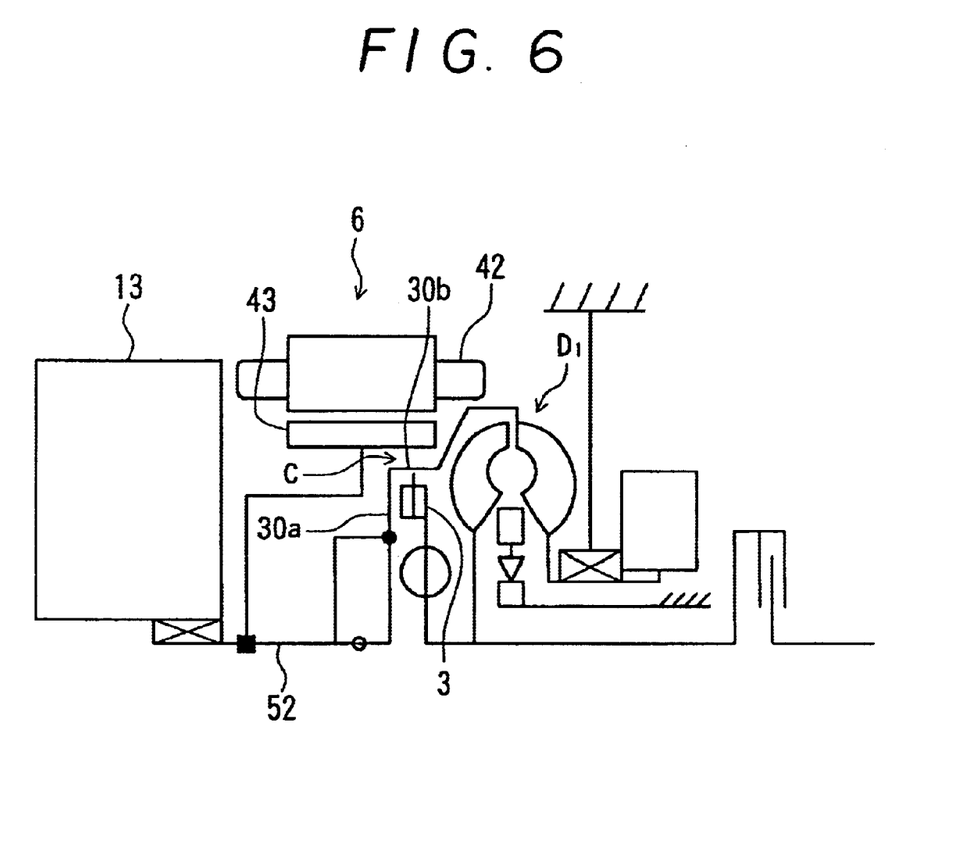
FIG. 6 is a skeletal view showing a variation of support for the rotor.

According to the embodiment as shown in FIG. 6, the drive apparatus has the rotor is fixed to and supported by the output shaft of the engine. Accordingly, since the rotor is fixed to and supported by the output shaft of the engine, the rotor does not move axially, even when the fluid transmitting apparatus is deformed by centrifugal hydraulic pressure or the like.

Figure 7:
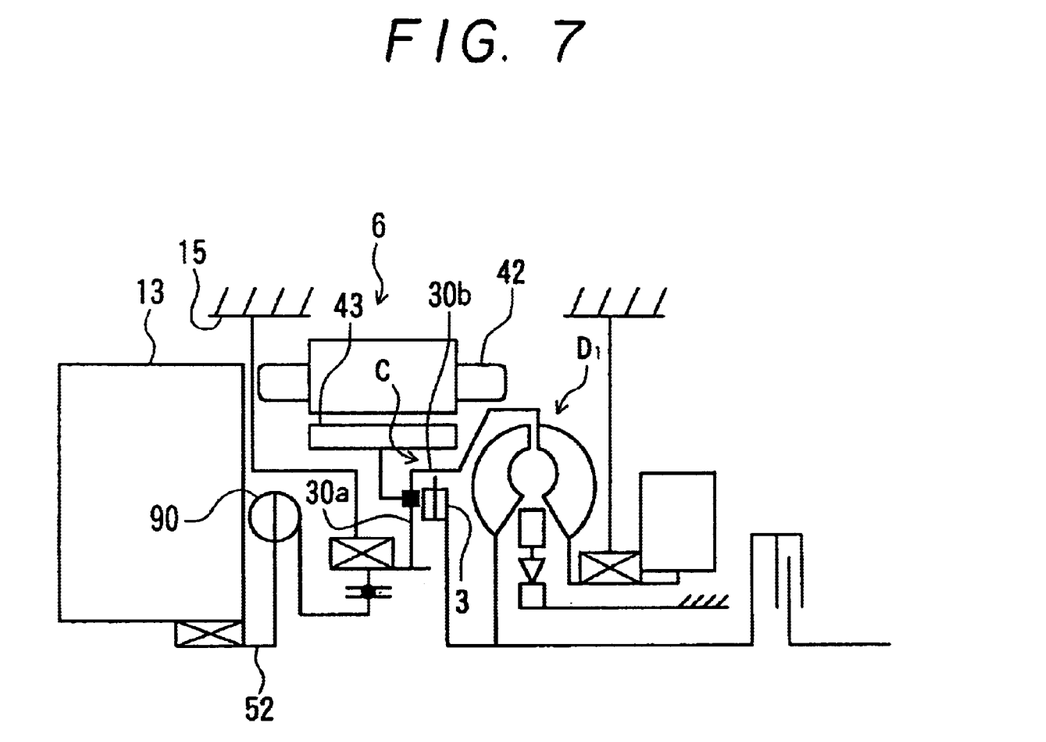
FIG. 7 is a skeletal view showing a variation of support for the rotor.

As shown in FIG. 7, the drive apparatus the rotor may be supported by the case and the input member of the fluid transmitting apparatus. Accordingly, since the rotor is supported by the case and the input member of the fluid transmitting apparatus, it is possible to more reliably prevent the rotor from shifting relative to the stator.

Figure 8:
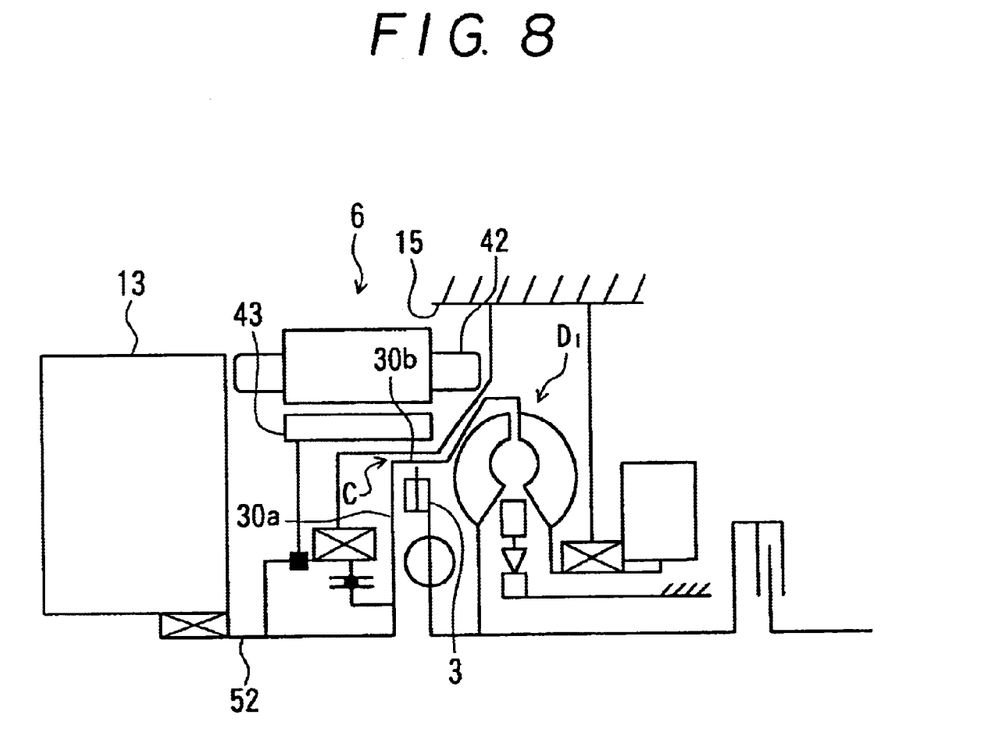
FIG. 8 is a skeletal view showing a variation of support for the rotor.

As shown in FIG. 8, alternatively, the rotor may be supported by the case and the output shaft of the engine. Accordingly, since the rotor is supported by the case and the output shaft of the engine, it is possible to reliably prevent the rotor from shifting relative to the stator both axially and radially.

In the present invention, the rotor has a shaft portion at its center of rotation, and the shaft portion of the rotor is in contact with an output shaft of the engine in an axially narrow area, whereby the rotor shaft is supported by the output shaft in a manner allowing free relative movement. Therefore, it is possible to reduce transmission of explosive vibration of the engine to the rotor, whereby the gap between the rotor and the stator can be reduced to increase efficiency of the motor.

According to a preferred embodiment of the present invention, a concave portion (hole or recess) is formed in an end surface of the output shaft of the engine, and an axially narrow support area is formed by an annular protrusion on the shaft of the rotor, and the rotor shaft is inserted into the concave portion whereby the protrusion comes into contact with the output shaft, and is thereby supported by the output shaft. Therefore, it is possible to reduce transmission of explosive vibration of the engine to the rotor, thereby increasing efficiency of the motor.

In another preferred embodiment of the present invention, the fluid transmitting apparatus has a front cover covering a turbine runner and serving as the input member connected to a pump impeller, and the rotor is supported on the outer side of a portion of the front cover. However, because the degree of deformation of the cover due to hydraulic pressure is smaller toward the outer periphery than at the center portion, even when the cover is deformed by hydraulic pressure it is possible to maintain accuracy of centering of the rotor.

According to the present invention, the fluid transmitting apparatus has a centerpiece at its center of rotation and the rotor is centered by the center piece. Accordingly, it is possible to increase accuracy of centering of the rotor.

According to the present invention, the drive apparatus includes a flex plate for transmitting a driving force between the output shaft of the engine and the rotor, a part of the flex plate is extended radially outward of an outer periphery of the stator in the motor, and a sensor for detecting the phase of the rotor is arranged radially outward of the motor to detect the extended portion of the flex plate. Accordingly, it is sufficient to directly support the sensor by a member such as a motor housing or the like, whereby it is possible to reduce the axial dimension of the apparatus. Further, since the phase of the rotor in the motor is detected using the flex plate, it is possible to detect the motor phase without the necessity of a separate, dedicated member for detection.

Figure 3:
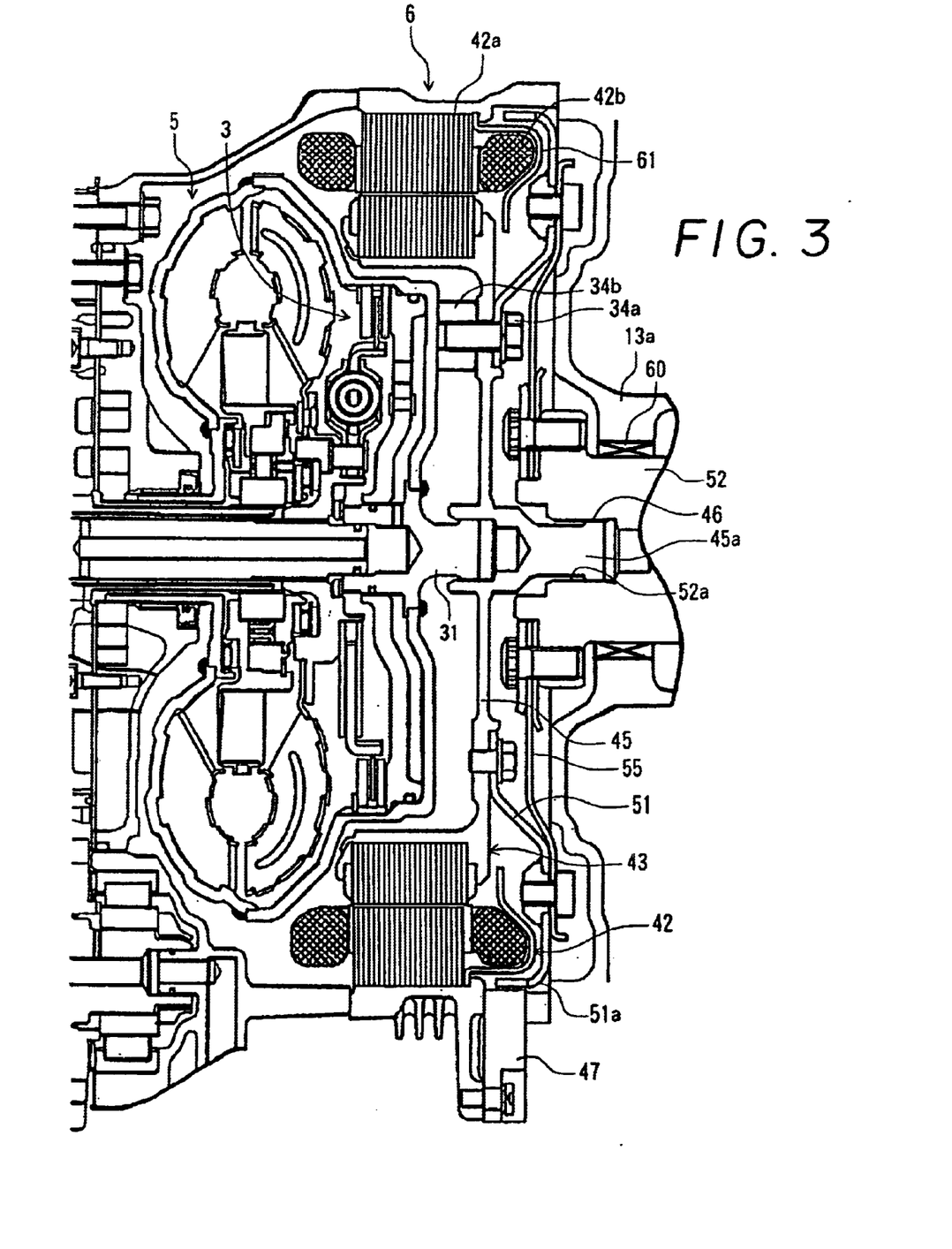
FIG. 3 is a cross-sectional view showing a motor/generator portion of a partly modified embodiment.

In the embodiment, for example, of FIG. 3, an end portion of an output shaft of the engine is rotatably supported by a bearing, a recess is formed in the end face of the output shaft, the rotor has a shaft at its center of rotation, the rotor shaft is inserted into the recess so as to be supported by the output shaft, and a portion of the engine output shaft by which the rotor is supported is arranged to at least partially axially overlap the bearing. Accordingly, since the engine output shaft is supported in the bearing and the rotor overlaps the bearing, a force applied to the engine output shaft from the rotor can be directly received by the bearing and it is thereby possible to reduce influence of the rotor on the engine output shaft, and further, since the portion of the engine output shaft supporting the rotor has less vibration due to the support by the bearing, even eccentric rotation of the engine output shaft caused by the explosive vibration of the engine little influences the rotor and it is therefore possible to support the rotor with a high degree of accuracy.

According to the present invention, the engine output shaft and the input member of the fluid transmitting apparatus are connected so as to freely move axially relative to each other. Accordingly, the rotor side is not affected by deformation of the fluid transmitting apparatus due to the centrifugal hydraulic pressure or the like.

According to another preferred embodiment of the present invention, the rotor and the input member of the fluid transmitting apparatus are integrally fixed so as to be rotatably supported by the case and are connected to the output shaft of the engine in a manner allowing free axial movement. Accordingly, it is possible to prevent the rotor from shifting relative to the stator.

According to yet another embodiment of the present invention, the rotor and the output shaft of the engine are integrally fixed so as to be rotatably supported by the case and are connected to the input member of the fluid transmitting apparatus in a manner allowing free axial movement in an axial direction relative to each other. Accordingly, in this embodiment also, it is possible to prevent the rotor from shifting relative to the stator.

In still another preferred embodiment of the present invention, the fluid transmitting apparatus has a front cover covering a turbine runner and serving as the input member connected to a pump impeller, the front cover has an axially extending portion and the rotor is arranged radially outward of the axially extending portion with the predetermined gap therebetween. Accordingly, the axial length of the whole of the drive apparatus can be reduced.

In the present invention, the predetermined gap is preferably within a range between 0.8 and 3.5 mm. Accordingly, it is possible to prevent dust such as iron powder from accumulating in a position close to the rotor, within the fluid transmitting apparatus, due to the magnetic flux output from the magnet of the rotor.

In another preferred embodiment of the present invention, the fluid transmission apparatus includes a multi-disc lockup clutch for connecting the input member to the turbine, and the lockup clutch is arranged radially inward of the axially extending middle portion of the front cover. Accordingly, given the aforementioned predetermined gap, it is possible to prevent dust such as iron powder from accumulating in the lockup clutch due to the magnetic flux output from the magnet of the rotor.

In the present specification, the term "motor" is not limited to a motor for converting electric energy into rotational motion, but includes generators for converting rotational motion into electric energy, the term "engine" means a device for converting energy obtained by burning a fuel into rotational motion and includes a gasoline engine, a diesel engine and the like, and the terminology "bearing portion" is not limited to a ball bearing such as a roller bearing or the like but rather includes all shaft supports, for example, a slide bearing such as a metal bearing, a journal bearing, a static pressure bearing and the like, an oil retaining bearing, a gas bearing and the like.

BRIEF DESCRIPTION OF THE PREFERRED EMBODIMENTS

Preferred embodiments of the present invention will now be described with reference to the accompanying drawings.

Figure 1:
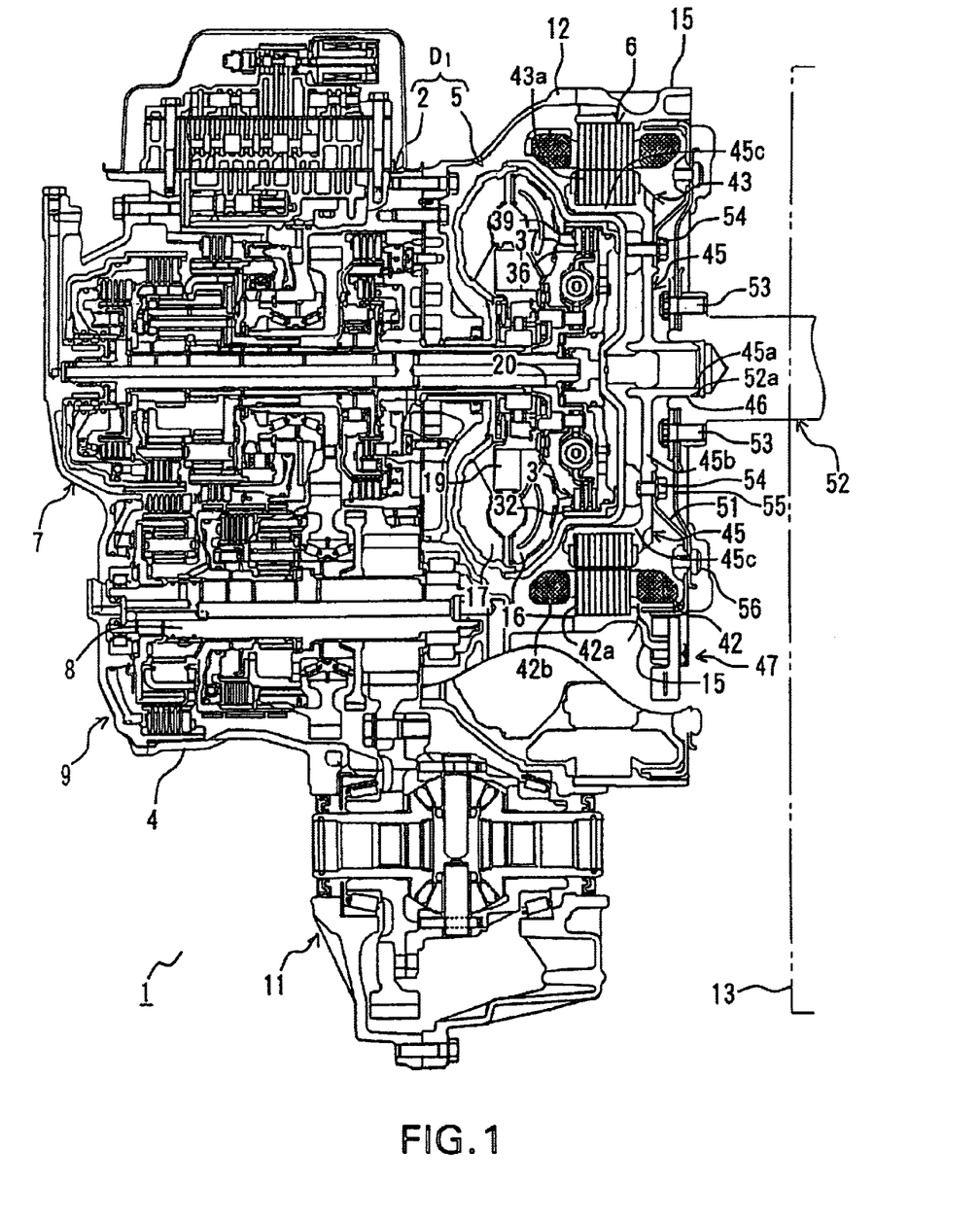
FIG. 1 is a cross-sectional view showing an embodiment of a drive apparatus for a hybrid vehicle in accordance with the present invention.
Figure 2:
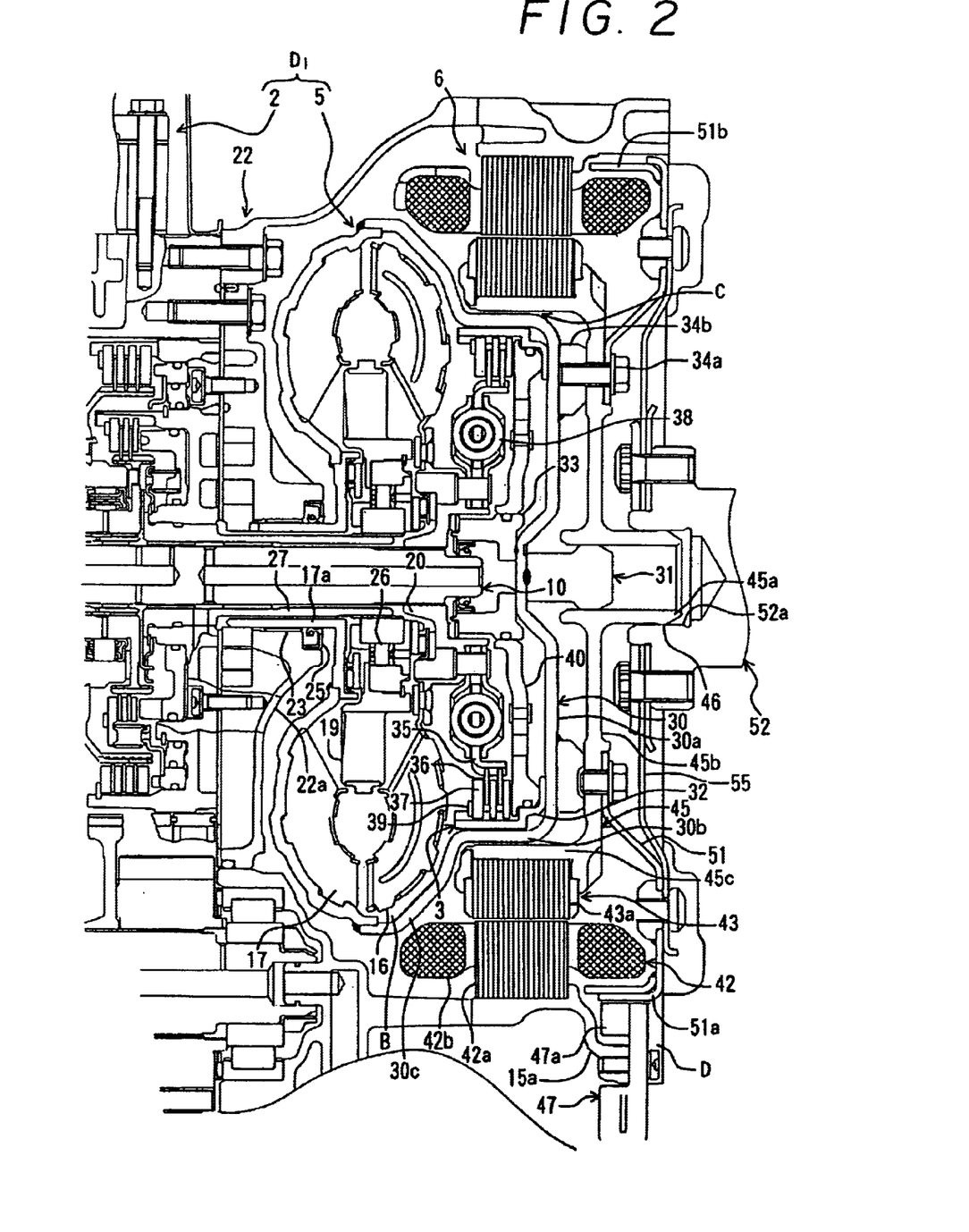
FIG. 2 is a cross-sectional view showing a torque converter and a motor/generator portion of the embodiment shown in FIG. 1.

FIGS. 1 and 2 show a first preferred embodiment wherein a drive apparatus 1 for a hybrid vehicle includes an internal combustion engine 13 such as a gasoline engine or the like, a motor/generator (a motor) 6 in the form of a brushless DC motor or the like housed in a motor housing 15, and a conventional automatic transmission $D_1$ to which a driving force output from the engine 13 and the motor/generator 6 are transmitted, with the motor/generator 6 mounted in a torque converter portion of the conventional automatic transmission $D_1$. Thus, the drive apparatus 1 for a hybrid vehicle according to the invention is structured such that the motor/generator 6 and the automatic transmission $D_1$ are arranged in sequence from one end of the engine.

A crankshaft (an output shaft) 52 extends from the internal combustion engine 13 to the motor/generator 6, and a flexible drive plate 55 is fixed to a front end portion of the crankshaft 52 by a bolt 53. Further, a flexible input plate 51 is arranged at a position opposing this drive plate 55 with front end portions thereof fixed and connected to each other by a bolt 56, to form a flex plate. In this case, a hole portion (a "concave portion" or "recess") 52a is formed in the end face of the crankshaft 52 of the internal combustion engine 13 (details will be described later).

The motor/generator 6 has a stator 42 and a rotor 43. The rotor 43 is formed of a plurality of laminated plates 43a in which permanent magnets are inserted, and a support plate 45 for fixing and supporting these laminated plates 43a. The support plate 45 includes a cylindrical shaft portion 45a arranged at its center of rotation, a disc portion 45b connected to the shaft portion 45a and extending along the drive plate 55 and a cylindrical holding portion 45c connected to an outer edge portion of the disc portion 45b. The laminated plates 43a mentioned above are held in the holding portion 45c arranged in an axial series. Further, as shown in detail in FIG. 2, an annular protrusion 46 is formed in an axially narrow area on an outer peripheral surface of a front end portion of the shaft portion 45a (that is, a band-like area on the outer peripheral surface of the shaft portion 45a having a narrow axial width). The shaft portion 45a is inserted to the hole 52a in the end face of the crankshaft 52 and the protrusion 46 is in contact with an inner surface of the hole 52a, whereby the shaft portion 45a is supported by the crankshaft 52 in a manner allowing free relative movement. Accordingly, it is possible to center the shaft portion 45a by suitably positioning the housing.

In the embodiment of FIGS. 1 and 2, the hole or "recess" 52a is formed in the end face of the crankshaft 52 and the shaft portion 45a of the rotor is inserted therein; however, the invention is not, of course, limited to this structure, provided the shaft portion 45a is in contact with the crankshaft 52 of the engine over an axially narrow area, whereby the shaft portion 45a is supported by the crankshaft 52 in such a manner as to permit free relative movement. For example, the hole may be formed in the shaft portion 45a of the rotor and the crankshaft 52 inserted therein.

An inner edge portion of the input plate 51 is fixed to the disc portion 45b by a bolt 54, and the flex plate, constituted by the input plate 51 and the drive plate 55, is arranged between the crankshaft 52 of the internal combustion engine and the rotor 43 so as to transmit driving force.

A plurality of iron cores 42a are fixed to the motor housing 15 so as to oppose the laminated plates 43a with a small gap therebetween, and a coil 42b is wound around the iron cores 42a to form the stator 42. The stator 42 is made as large as allowed by a minimum ground height of the vehicle, and a predetermined output is secured for multi-polarization. Further, the laminated plates 43a of the rotor 43 have a strength sufficient to resist the centrifugal force.

A part 51a of the flex plate is extended beyond the outer diameter of the stator 42 of the motor/generator 6. A sensor 47 is arranged at a position axially overlapping the motor/generator 6 (that is, a position opposing the flex plate), radially outward of the outer diameter of the motor/generator 6, and the extended portion of the flex plate is detected by the sensor 47, whereby the phase of the rotor 43 is detected. The sensor 47 is arranged at a front end (engine side) of the motor housing 15, and a detecting portion 47a thereof is located in an area D formed by a protrusion 15a of the motor housing 15.

The input plate (the flex plate) 51, integrally connected to the rotor disc portion 45b, extends radially outward to a peripheral edge portion 51a which is bent in such a manner as to cover one outer peripheral side of the stator coil 42b, and, together with a plate 51b integrally welded thereto, serves as that portion detected by the detector 47a. The detector 47a is provided for accurately detecting rotational position of the rotor 43 so as to control timing of an electric current supplied to the stator 42. It is also possible to detect the rotational position of the rotor 43 by the sensor 47 so as to secure performance of the motor/generator 6 and it is possible to reliably prevent a reverse rotation at a time of starting. No particular axial space need be provided by the sensor 47 and therefore the overall axial length of the apparatus need not be increased.

The automatic transmission $D_1$ mentioned above includes a torque converter (a fluid transmitting apparatus) 5 and a multi-stage speed change mechanism 2. The multi-stage speed change mechanism 2 has a main speed change mechanism portion 7 housed in a mission case 4 and coaxially arranged with an input shaft 10, a sub-speed change mechanism portion 9 coaxially arranged with a counter shaft 8 parallel to the input shaft, and a differential apparatus 11 coaxially arranged with a front wheel drive shaft, and is of the front engine and front drive type (FF type) in which the foregoing components are housed in an integral case capable of being separated.

The torque converter 5 is, as shown in detail in FIG. 2, housed in a converter housing 12 and has a lockup clutch 3, a turbine runner 16, a pump impeller 17, a stator 19 and a front cover (an input member of a transmission) 30 arranged so as to cover them. A center piece 31 is fixed to an outer side of the cover 30 at the center of rotation and a lockup piston hub 33 is fixed to an inner side thereof.

The front cover 30 includes a disc-shaped inner portion 30a which extends along the disc portion 45b of the rotor 43, a cylinder-shaped middle portion 30b integral with and extending axially from the inner portion 30a and concentric with the holding portion 45c, and an outer portion 30c connected to the middle portion 30b, conforming to the outer shape of the turbine runner 16 and fixed to the pump impeller 17. The stator 42 and the rotor 43 mentioned above are radially aligned with the middle portion 30b of the front cover 30, with a predetermined gap C between the middle portion 30b and the holding portion 45c.

The center piece 31 is inserted to the shaft portion 45a of the rotor 43 in such a manner as to allow free relative movement in the axial direction, thereby centering the rotor 43 with respect to the torque converter 5. The torque converter 5 has an outer shell (the front cover 30 or the like) which is deformed by a change of a centrifugal hydraulic pressure and a charge pressure. Particularly, the amount of deformation is greatest as an axial deformation at the center of rotation, and, accordingly, the center piece 31 moves axially. However, since the center piece 31 and the rotor shaft 45a are supported for free relative axial movement, accuracy of support of the rotor 43 is not affected by the axial movement of the center piece 31.

The rotor 43 is fixed to the inner portion 30a of the front cover 30. That is, the disc portion 45b of the rotor 43 is fixed to the inner portion 30a of the front cover by a bolt 34a and a nut 34b welded to the front cover 30. Accordingly, since the torque converter 5 deforms to a large extent toward in the center portion and to a smaller extent toward the outer periphery of the front cover 30 as mentioned above, the rotor 43 mounted radially outward of the front cover is not largely affected by the deformation of the torque converter 5 in terms of the support accuracy.

A lockup piston hub 33 is formed as a cylinder surrounding the input shaft 10, and an oil seal is arranged between the lockup piston hub 33 and the input shaft 10.

The rotor 43 is supported by the crankshaft 52 so as to move freely relative thereto, as described above, however, its axial movement is restricted by the drive plate 55 and the input 51 so that the axial movement is small.

Since the crankshaft 52 and the rotor shaft 45a are in contact only at the narrow protrusion 46, only the contact position is changed even if the crankshaft 52 eccentrically rotates due to the explosive vibration of the engine 13, so that it is possible to reduce the transmission of the eccentric rotation of the crankshaft 52 to the rotor shaft 45a.

The lockup clutch 3 is arranged radially inward of the middle portion 30b of the front cover 30. The lockup clutch 3 is provided with a drum 32 which is fixed to the inner portion 30a of the front cover and which extends axially along the middle portion 30b. Axially extending splines are formed on the interior surface of the drum 32, a plurality of outer friction plates 37 are supported on the splines and prevented from coming off by a snap ring 39. Further, a piston plate 40 extends radially between the inner peripheral surface of the drum 32 and the outer peripheral surface of a lockup piston hub 33. Further, a hub 20 is splined to the input shaft 10 in the vicinity of the lockup piston hub 33, a hub 35 is supported by the hub 20, and a damper spring 38 is interposed between the hubs 35 and 20 for absorbing impact rotation. Further, the hub 35 has an outer surface opposing the drum 32 to which a plurality of inner friction plates 36 are splined. Thus, a multi plate disc clutch is formed by the outer friction plates 37 and the inner friction plates 36.

Further, an orifice, formed in the piston plate 40, provides communication between the oil chambers partitioned by the piston plate 40 while throttling transfer of hydraulic pressure between the oil chambers, changes flow direction of the oil so as to move the piston plate 40, controls the force applied to the outer friction plate 37, and controls engagement, release or slip between the friction plates 36 and 37.

The lockup clutch 3 has a diameter smaller than that of a torus formed by the turbine runner 16 of the torque converter 5 and the outer shell of the pump impeller 17, and is arranged so that the drum 32 is substantially axially aligned with the center of the torus.

The lockup clutch 3 has a small diameter so that it can be housed inside the motor/generator 6, however, it is structured such that even if both the motor/generator 6 and the internal combustion engine 13 are driven, the driving force thereof can be reliably transmitted to the input shaft 10.

The turbine runner 16 is connected to the hub 20 so as to integrally rotate with the input shaft 10.

Further, the pump impeller 17 is fixed to the outer portion 30c of the front cover 30, and the hub 17a is fixed to another base portion.

A sleeve 27 is arranged between the hub 17a and the input shaft 10, surrounding the input shaft 10, and an inner cage of a one-way clutch 26 is fixed to a front end portion of the sleeve 27. The one-way clutch 26 is connected to the stator 19.

An oil pump 22 is arranged between the left side of the torque converter 5 and the multi-stage speed change mechanism 2, and the hub 17a mentioned above is rotatably supported on an inner peripheral surface of a pump case 22a via a bush 23. Accordingly, the disc portion 45b of the rotor 43 is supported by the pump case 22a via the bolt 34a, the nut 34b, the front cover 30 and the hub 17a. It is possible to secure a wide span between the two supports for the rotor 43 (that is, the support by the crankshaft 52 and the support by the pump case 22a). Accordingly, even in the case that the crankshaft 52 rotates eccentrically, the angle of deflection of the disc portion 45b of the rotor will be small, so that it is possible to make the gap between the rotor 43 and the stator 42 small and to thereby increase efficiency of the motor/generator. An oil seal 25 is arranged between the pump case 22a and the hub 17a. The sleeve 27 extends from the oil pump 22.

FIG. 3 shows a partly modified embodiment. In description of this embodiment, the same reference numerals are attached to features the same as those of the preceding embodiment and a description thereof will be omitted. The engine crankshaft 52 in accordance with the present embodiment has a hole (the "concave portion" or "recess") 52a deeper than that of the preceding embodiment formed in its end face, and an outer periphery of the end portion is rotatably supported by the engine main body 13a via a bearing 60, such as a metal bearing or the like.

A shaft portion of the rotor, that is, the shaft 45a extends from the center of rotation of the support plate 45 toward the engine side. The shaft 45a is formed solid, and an annular protrusion 46 is formed in an axially narrow area on the outer peripheral surface of the front end portion of shaft 45a. Further, the rotor shaft 45a is longer than in the preceding embodiment, is inserted to the crankshaft hole 52a, and the protrusion 46 is in contact with the inner surface of the hole 52a so as to form a support.

The protrusion 46, through which the rotor shaft is supported by the engine crankshaft 52, is arranged so that the bearing 60 of the crankshaft 52 and at least a part of the protrusion 46 axially overlap with each other.

The support at protrusion 46 by the crankshaft of the rotor shaft 45a is arranged near the bearing 60 of the crankshaft, whereby the mass of the rotor of the motor/generator 6 is not applied to the crankshaft but, rather, is directly supported by the bearing 60 via the crankshaft. That is, the force applied to the engine crankshaft by the rotor 43 is directly supported by the bearing 60, whereby the rotor exerts little influence on the crankshaft. Further, since the crankshaft portion supporting the rotor shaft is supported by the bearing 60, and therefore is not oscillated, eccentric rotation of the crankshaft 52 caused by the explosive vibration of the engine is not transmitted to the rotor 43.

In the embodiment of FIG. 3, reference numeral 61 denotes a shield plate for shielding leakage flux from the motor/generator 6. The shield plate 61 is fixed to the stator iron core 42a at one end, extends axially away from the stator iron core, axially along the outer peripheral surface of the stator coil 42b, and further extends radially inward along the stator coil 42b. Accordingly, with respect to the leakage flux from the stator coil 42b, a closed loop is formed along a path through the stator coil 42b, the shield plate 61 and the stator iron core 42a so as to prevent the leakage flux from flowing to the other members, thereby shielding the rotational position detecting sensor 47 to protect it from erroneous operation due to the influence of the leakage flux.

Figure 9A:
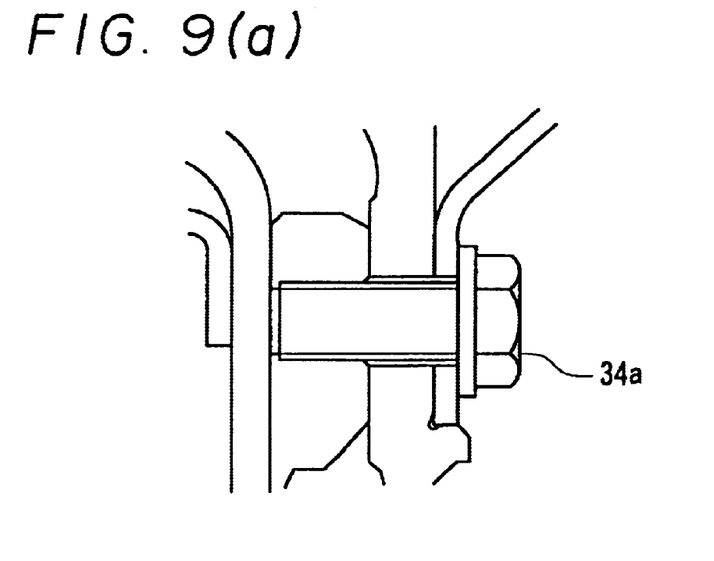
FIG. 9 is a schematic view explaining definitions of reference symbols used in FIGS. 4 to 8.
Figure 9B:
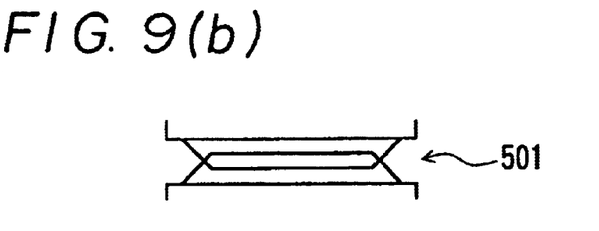
Figure 9C:
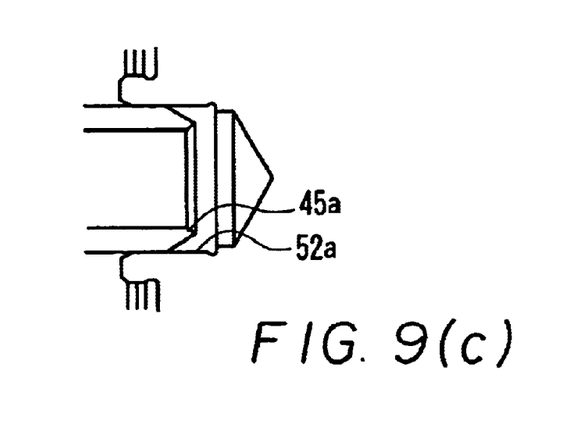

FIGS. 4 to 8 are skeletal views showing variations of the rotor support, and FIG. 9 is a view explaining definitions of reference symbols used in FIGS. 4 to 8. That is, in FIGS. 4 to 8, "■" (black square) denotes a drive connection and support, e.g., fastened by a bolt or the like such as a bolt 34a (corresponding to FIG. 2) shown in FIG. 9(a). Further, "●" (black circle) denotes only a drive connection, and this means that a driving force is transmitted by a spline 501 connected to a flexible member and transmitting the driving force as shown in FIG. 9(b). Further, "○" (outline circle)" denotes only support, and this means only supported and not transmitted a driving force such as the support of shaft 45a within the hole 52a (corresponding to FIG. 2) shown in FIG. 9(c). In FIGS. 4 to 8, features the same as in FIGS. 1 and 2 have the reference numerals used in FIGS. 1 and 2.

FIG. 4 is a skeletal view of the embodiment shown in FIGS. 1 and 2 mentioned above. As has been already described, the rotor 43 is supported at two points, i.e., by the crankshaft 52 and by the inner portion 30a of the front cover of the torque converter. The gap C is provided between the middle portion 30b of the front cover and the rotor 43.

As shown in FIG. 5, it is possible to fix and support the rotor 43 on the inner portion 30a (the input member) of the front cover of the torque converter. In this case, the gap C is also provided between the middle portion 30b of the front cover and the rotor 43.

As shown in FIG. 6, it is also possible to support the rotor 43 on the crankshaft 52. The crankshaft 52 and the inner portion 30a (the input member) of the torque converter are supported so move axially freely relative to each other. In this case also, the gap C is provided between the middle portion 30b of the front cover and the rotor 43.

As shown in FIG. 7, it is also possible to support the rotor 43 by two elements, i.e., by the inner portion 30a (the input member) of the front cover of the torque converter and by the motor housing 15 (the case). The rotor 43 and the inner portion 30a are integrally fixed, and the rotor 43 is rotatably supported to the motor housing 15 and connected to the crankshaft 52 of the engine 13 so as to freely move in the axial direction. In this case also, the gap C is provided between the middle portion 30b of the front cover and the rotor 43. Reference numeral 90 in FIG. 6 denotes a flex plate.

As shown in FIG. 8, it is further possible to support the rotor 43 by the crankshaft 52 and by the motor housing 15 (the case). The rotor 43 and the crankshaft 52 of the engine 13 are integrally fixed, and the rotor 43 is rotatably supported to the motor housing 15 and connected to the inner portion 30a (the input member) of the front cover in the torque converter in a manner allowing free axial movement. In this case, the gap C is also provided between the middle portion 30b of the front cover 30 and the rotor 43.

As mentioned above, the rotor 43 can be supported by either the inner portion 30a of the front cover 30 of the torque converter and the crankshaft 52 of the engine 13 or a combination of any two of the inner portion 30a of the front cover of the torque converter, the motor housing 15 (the case) and the crankshaft 52 of the engine 13.

Operation of the drive apparatus 1 for the hybrid vehicle is described below.

With the vehicle stopped, when a driver turns on an ignition switch (not shown) and depresses an accelerator pedal, an electric current is supplied to the motor/generator 6 from a battery (not shown) and the motor/generator 6 functions as a motor. That is, when a controller (not shown) applies the electric current to the coil 42b of the stator 42, at a suitable timing on the basis of a signal (the position of the rotor 43) from the sensor 47, the rotor 43 rotates in a forward direction and at a high efficiency, and the rotational driving force is transmitted to the torque converter 5 via the support plate 45, the bolt 34a and the nut 34b, is increased by a predetermined torque ratio by the torque converter 5 and is thereafter transmitted to the input shaft 10.

When the vehicle starts, the fuel injection apparatus of the internal combustion engine 13 is not operated and the engine 13 is off, so that the vehicle starts with only the driving force from the motor/generator 6. In this case, since the support plate 45 is rotated in the manner described above, and the crankshaft 52 is rotated via the input plate 51 and the drive plate 55, so that the piston reciprocates while repeatedly compressing and releasing the gas in the cylinder chamber. In this case, the motor/generator 6 has a drive characteristic of output of a high torque at a low rotational speed, and the vehicle smoothly starts and travels with a predetermined torque increased by the torque ratio of the torque converter 5 and a high torque ratio generated by a first speed stage of the multi-stage speed change mechanism 2.

Further, even in the case where the speed immediately after the vehicle starts is comparatively low, when the accelerator pedal is depressed so as to accelerate, resulting in opening the throttle to a degree equal to or more than a predetermined degree of opening, the fuel injection apparatus is operated, the motor/generator 6 functions as a starter motor, the ignition plug is ignited and the internal combustion engine 13 is started. Accordingly, the crankshaft 52 is rotated, and the rotational driving force is transmitted to the support plate 45 via the drive plate 55 and the input plate 51. Then, both the driving force of the internal combustion engine 13 and that of the motor/generator 6 functioning as a motor are added so as to be transmitted to the torque converter 5, and the vehicle is propelled by a large driving force. At this time, the multi-stage speed change mechanism 2 is shifted up, and the rotation at a desired rotational speed is transmitted to the driving wheel.

When the vehicle is in a normal high speed traveling state, the motor/generator 6 is operated in a no-load mode, i.e., driven to produce a motor output which offsets the torque generated by a counter electromotive force generated in the motor, and the motor/generator 6 is raced. Accordingly, the vehicle travels exclusively with the driving force of the internal combustion engine 13.

When the state of charge (SOC) of the battery becomes low, it is regenerated by operating the motor/generator 6 as a generator. In the state driven by the internal combustion engine 13 alone or in the state driven by the motor in combination with the internal combustion engine 13 (and in some cases, in the state driven only by the motor), the multi plate disc clutch (the outer friction plate 37 and the inner friction plate 36) is engaged by changing to the direction of the converter pressure so as to move the piston plate 40.

Accordingly, the torque transmitted to the front cover 30 is directly transmitted to the input shaft 10 via the drum 32, the outer friction plate 37, the inner friction plate 36, the hub 35, the damper spring 38 and the turbine hub 20 without passing through the oil within the torque converter.

Further, when the output of the internal combustion engine 13 is in excess of that required for travel, such as during normal low or middle speed travel or downhill travel, the motor/generator 6 functions as a generator so as to charge the battery, in accordance with the SOC of the battery. In particular, when an engine brake is required in downhill travel, it is possible to obtain a sufficient engine brake by increasing the regenerating electric power of the motor/generator 6 operating as a generator. Further, when the driver depresses the foot brake pedal to reduce the speed of the vehicle, the regenerating electric current to the motor/generator 6 is further increased, the motor/generator 6 is operated as a regenerating brake, the inertia energy of the vehicle is converted to electric power, and a braking force generated by the friction brake is reduced, whereby energy consumption wasted as heat is reduced. Further, the motor/generator 6 is operated in a regenerating mode so as to drive the engine in a high efficiency area, even in the middle speed range, whereby it is possible to improve engine efficiency and it is also possible AC to increase motor travel on the basis of the electric charge of the battery, so that energy efficiency can be further improved.

When the vehicle stops at a signal or the like, the motor/generator 6 is stopped and the fuel injection apparatus is turned off, whereby the internal combustion engine is also stopped. Thus, there is no idling state as in the conventional engine operation. Further, the vehicle is started from the stop state in the manner described above, that is, at first the vehicle is driven by the motor driving force of the motor/generator 6, the engine is then started by the motor driving force in the comparatively low speed state which immediately follows, the vehicle is smoothly driven assisted by the driving force of the motor 6 without a rapid driving force change of the engine, and the motor/generator 6 is used as the regenerating brake when the engine brake is required and the vehicle is braked and stopped, so as to convert the vehicle inertial energy into electric energy. Further, in an operational area of poor engine efficiency, such as at the time of low load or extremely low load on the engine, the vehicle is driven by the motor. Due to the combination of these advantages, the hybrid vehicle can save fuel consumption and reduce exhaust gas.

In the case of the embodiment described above, the present invention is applied to the FF type automatic transmission $D_1$. However, the invention is so not limited, and may be applied to an automatic transmission of an FR type or an automatic transmission of a CVT type.

With the above-described embodiment, since the motor/generator 6 constituted by the stator 42 and the rotor 43 is arranged radially outward of the torque converter 5 (more accurately, radially outward of the middle portion 30b of the front cover 30) and at a position axially overlapping the torque converter 5, it is possible to reduce the axial dimension as compared with a structure in which the motor/generator and the torque converter are not overlapped with each other, and it is possible to make the apparatus more compact.

Further, in accordance with the above-described embodiment, since a fixed member for rotatably supporting the rotor 43 is not required, it is possible to reduce the axial dimension of the apparatus and to make the apparatus more compact.

In the internal combustion engine 13, since the piston is reciprocated by explosions within the cylinder chamber and the crankshaft 52 is rotated by the piston reciprocation, the crankshaft 52 tends to rotate eccentrically. However, since the crankshaft 52 and the rotor support plate 45 are connected via the input plate 51, the drive plate 55 and the like, the eccentric rotation is absorbed by deflection of the plates 51 and 55. Further, of the shaft portion 45a of the rotor support plate 45, only the narrow annular protrusion 46 is in contact with the crankshaft 52. Accordingly, it is possible to reduce the transmission of the explosive vibration of the internal combustion engine 13 to the rotor support plate 45, and it is possible to reduce the gap between the rotor 43 and the stator 42 and to increase efficiency of the motor/generator.

In particular, as shown in FIG. 3, when the protrusion 46 of the rotor shaft 45a overlaps with the bearing 60 supporting the crankshaft, it is also possible to directly support the force applied to the crankshaft at the bearing portion 60. It is also possible to reduce the influence of the rotor on the crankshaft. Further, since the protrusion supporting the rotor shaft in the crankshaft is directly supported by the bearing so as not to oscillate, the eccentric rotation of the crankshaft is not transmitted to the rotor, and it is possible to improve the accuracy of position of the rotor and to more reliably increase efficiency of the motor/generator by the reduction of the air gap.

The disc portion 45b of the rotor 43 is fixed to the inner portion 30a of the front cover 30 and on the outer peripheral diameter side of the front cover 30. Further, the rotor 43 is centered by the axially movable center piece 31. Accordingly, even if the front cover 30 is deformed by hydraulic pressure supplied to the converter chamber B, the centering accuracy of the rotor 43 is maintained.

Further, because of the gap C between the middle portion 30b of the torque converter 5 and the holding portion 45c of the rotor 43, and because the rotor 43 is not supported by the middle portion 30b of the torque converter 5, the position of the rotor 43 does not move even if the torque converter 5 is deformed by the centrifugal hydraulic pressure or the like. Accordingly, the rotor 43 will not move radially so as to interfere with the stator 42. Further, since there is no interference between the rotor 43 and the stator 42, it is not necessary to enlarge secure the gap between the stator 42 and the rotor 43, and thus efficiency of the motor is not reduced. Further, the heat output from the torque converter 5 is not easily transmitted to the rotor 43 and its magnetism does not deteriorate. Further, since the positions of the lockup clutch 3 and the rotor 43 are spaced from each other by the gap C, dust such as iron powder or the like is not accumulated in the lockup clutch 3 due to the magnetic flux generated by the magnet, and the operation of the lockup clutch 3 is ensured.

The dimension of the gap C, as mentioned above, is sufficient between 0.8 and 3.5 mm, and is suitably 2 mm. The radial displacement of the middle portion 30b of the torque converter 5 is about 0.5 to 1 mm; however, the above values for gap C are set by taking the influence of the magnetic flux from the rotor 43 into consideration.

In accordance with the present embodiment, hydraulic pressure (that is, the charge pressure or the centrifugal hydraulic pressure) is applied to the converter chamber B formed by the front cover 30 and the outer shell of the pump impeller 17; however, the front cover 30 has the step-like middle portion 30b extending axially as described above and has a strongly-built structure, and therefore is not easily deformed.

Further, in accordance with the present embodiment, since the sensor 47 detecting the phase of the rotor 43 is arranged on the radially outer side of the motor/generator 6 so as to detect the extended portion of the flex plate, it is sufficient that the sensor 47 be directly supported by the front end portion of the motor housing or the like, and it is unnecessary to additionally provide a member specifically for supporting the sensor 47 adjacent the flex plate or the rotor 43, so that it is possible to reduce the overall axial dimension of the apparatus. Further, by detecting the phase of the rotor 43 of the motor/generator 6 using the flex plate, it is possible to detect the phase without providing an additional, dedicated element.

The drive apparatus for a hybrid vehicle in accordance with the present invention is useful as a drive for passenger cars, trucks, buses, and the like, and is particularly suitable for use as the drive for a compact size automobile.

What is claimed is:

1. A drive apparatus for a hybrid vehicle comprising:
   a motor including a stator and a rotor;
   an automatic transmission having a fluid transmitting apparatus including a front cover serving as an input member for receiving driving force output from said motor and a lock-up clutch; and
   wherein said motor is arranged radially and axially overlapping said front cover of said fluid transmitting apparatus, with a predetermined gap between said rotor and said front cover of said fluid transmitting apparatus; and
   wherein said rotor axially overlaps said lock-up clutch.

2. A drive apparatus for a hybrid vehicle according to claim 1 further comprising:
   an engine having an output shaft;
   a case for receiving said motor; and
   wherein said rotor is supported by the output shaft of the engine and the input member of said fluid transmitting apparatus.

3. The drive apparatus for a hybrid vehicle according to claim 1
   wherein said rotor is fixed to and supported by only the input member of said fluid transmitting apparatus.

4. The drive apparatus for a hybrid vehicle according to claim 1
   wherein said rotor is fixed to and supported by only an output shaft of the engine.

5. The drive apparatus for a hybrid vehicle according to claim 2, wherein said rotor includes a hub at a center of rotation thereof, said hub having a shaft portion contacting an output shaft of the engine only in an axially narrow area, thereby being supported by the output shaft for free axial movement relative to the output shaft.

6. The drive apparatus for a hybrid vehicle according to claim 2,
   said front cover covers a turbine runner and includes a radially extending inner portion and an axially extending middle portion and said rotor is arranged on an outer side of and parallel to said middle portion with said predetermined gap therebetween.

7. The drive apparatus for a hybrid vehicle according to claim 2, wherein said predetermined gap is within a range between 0.8 and 3.5 mm.

8. The drive apparatus for a hybrid vehicle according to claim 3
   wherein said fluid transmitting apparatus has a front cover covering a turbine runner and serving as said input member connected to a pump impeller, said front cover including a center portion, a middle portion extending radially outward from said center portion and an outer portion connected to said center portion, and
   wherein said front cover has an axial extension at said center portion, and wherein said rotor has a central hub mounted on said axial extension, thereby centering said rotor.

9. The drive apparatus for a hybrid vehicle according to claim 3, wherein said fluid transmitting apparatus has a front cover covering a turbine runner and serving as said input member connected to a pump impeller, and
   said front cover includes a radially extending inner portion and an axially extending middle portion and said rotor is arranged on an outer side of and parallel to said middle portion with said predetermined gap therebetween.

10. The drive apparatus for a hybrid vehicle according to claim 3, wherein said predetermined gap is within a range between 0.8 and 3.5 mm.

11. The drive apparatus for a hybrid vehicle according to claim 4, wherein said fluid transmitting apparatus has a front cover covering a turbine runner and serving as said input member connected to a pump impeller, and
    said front cover includes a radially extending inner portion and an axially extending middle portion and said rotor is arranged on an outer side of and parallel to said middle portion with said predetermined gap therebetween.

12. The drive apparatus for a hybrid vehicle according to claim 4, wherein said predetermined gap is within a range between 0.8 and 3.5 mm.

13. The drive apparatus for a hybrid vehicle according to claim 6, wherein said fluid transmitting apparatus includes a multi-disc lockup clutch for connecting said input member to said turbine, and
    said lockup clutch is arranged radially inward of said middle portion of said front cover.

14. The drive apparatus for a hybrid vehicle according to claim 9, wherein said fluid transmitting apparatus includes a multi-disc lockup clutch for connecting said input member to said turbine, and
    said lockup clutch is arranged radially inward of said middle portion of said front cover.

15. The drive apparatus for a hybrid vehicle according to claim 11, wherein said fluid transmitting apparatus includes a multi-disc lock-up clutch for connecting said input member to said turbine, and
    said lockup clutch is arranged radially inward of said middle portion of said front cover.

16. A drive apparatus for a hybrid vehicle comprising:
    a motor including a stator and a rotor;
    an automatic transmission having a fluid transmitting apparatus with an input member for receiving driving force output from an engine and said motor;
    a case for receiving said motor;
    wherein said motor is arranged radially and axially overlapping said fluid transmitting apparatus, with a predetermined gap between said rotor and said fluid transmitting apparatus, and wherein said rotor is supported by the output shaft of the engine and an input member of said fluid transmitting apparatus;
    wherein said rotor comprises laminated plates and a supporting plate supporting said laminated plates; and
    wherein said supporting plate is directly centered by direct radial contact with an output shaft of the engine.

17. A drive apparatus for a hybrid vehicle comprising:

a motor including a stator and a rotor;

an automatic transmission having a fluid transmitting apparatus with an input member for receiving driving force output from an engine and said motor;

a case for receiving said motor; and wherein said motor is arranged radially and axially overlapping said fluid transmitting apparatus, with a predetermined gap between said rotor and said fluid transmitting apparatus, and wherein said rotor is supported by said case and the input member of said fluid transmitting apparatus.

18. The drive apparatus for a hybrid vehicle according to claim 17, wherein said fluid transmitting apparatus has a front cover covering a turbine runner and serving as said input member connected to a pump impeller, and said front cover includes a radially extending inner portion and an axially extending middle portion and said rotor is arranged on an outer side of and parallel to said middle portion with said predetermined gap therebetween.

19. The drive apparatus for a hybrid vehicle according to claim 17, wherein said predetermined gap is within a range between 0.8 and 3.5 nm.

20. The drive apparatus for a hybrid vehicle according to claim 18, wherein said fluid transmitting apparatus includes a multi-disc lockup clutch for connecting said input member to said turbine, and said lockup clutch is arranged radially inward of said middle portion of said front cover.

21. A drive apparatus for a hybrid vehicle comprising:

a motor including a stator and a rotor;

an automatic transmission having a fluid transmitting apparatus with an input member for receiving driving force output from an engine and said motor;

a case for receiving said motor; and wherein said motor is arranged radially and axially overlapping said fluid transmitting apparatus, with a predetermined gap between said rotor and said fluid transmitting apparatus, and wherein said rotor is supported by said case and an output shaft of the engine.

22. The drive apparatus for a hybrid vehicle according to claim 21, wherein said fluid transmitting apparatus has a front cover covering a turbine runner and serving as said input member connected to a pump impeller, and said front cover includes a radially extending inner portion and an axially extending middle portion and said rotor is arranged on an outer side of and parallel to said middle portion with said predetermined gap therebetween.

23. The drive apparatus for a hybrid vehicle according to claim 21, wherein said predetermined gap is within a range between 0.8 and 3.5 mm.

24. The drive apparatus for a hybrid vehicle according to claim 22, wherein said fluid transmitting apparatus includes a multi-disc lockup clutch for connecting said input member to said turbine, and said lockup clutch is arranged radially inward of said middle portion of said front cover.

* * * * *